United States Patent
Schwartz

(10) Patent No.: US 11,556,910 B2
(45) Date of Patent: Jan. 17, 2023

(54) MACHINE-IMPLEMENTED TWO-PART BANK-CARD-BACKED FINANCIAL TRANSACTIONS

(71) Applicant: Global Payments Gaming Services Inc., Las Vegas, NV (US)

(72) Inventor: Andrew J. Schwartz, Las Vegas, NV (US)

(73) Assignee: Global Payments Gaming Services Inc., Las Vegas, NV (US)

( * ) Notice: Subject to any disclaimer, the term of this patent is extended or adjusted under 35 U.S.C. 154(b) by 123 days.

(21) Appl. No.: 16/856,403

(22) Filed: Apr. 23, 2020

(65) Prior Publication Data

US 2020/0349537 A1 Nov. 5, 2020

Related U.S. Application Data

(60) Provisional application No. 62/840,436, filed on Apr. 30, 2019.

(51) Int. Cl.
    G06Q 20/10     (2012.01)
    G06K 7/00      (2006.01)
    G07F 19/00     (2006.01)

(52) U.S. Cl.
    CPC ....... G06Q 20/1085 (2013.01); G06K 7/0013 (2013.01); G07F 19/203 (2013.01)

(58) Field of Classification Search
    CPC . G06Q 20/1085; G06K 7/0013; G07F 19/203
    See application file for complete search history.

(56) References Cited

U.S. PATENT DOCUMENTS

| | | | |
|---|---|---|---|
| 2005/0107155 A1* | 5/2005 | Potts | G07F 19/203 463/25 |
| 2007/0080207 A1* | 4/2007 | Williams | G06Q 40/12 705/45 |
| 2010/0059587 A1* | 3/2010 | Miller | G06Q 20/4014 235/379 |
| 2011/0191242 A1* | 8/2011 | Allen | G07F 19/202 705/43 |
| 2011/0231314 A1* | 9/2011 | Sears | G07F 17/32 705/43 |
| 2013/0018788 A1* | 1/2013 | Johnson | G07F 19/201 705/43 |

OTHER PUBLICATIONS

Business Editors World Gaming Congress 2000, "Shift4 Introduces New Credit Card Cash-Advance Solution at the World Gaming Congress Exposition 2000", Business Wire, Oct. 18, 2000. (Year: 2000).*

* cited by examiner

*Primary Examiner* — Eric T Wong
(74) *Attorney, Agent, or Firm* — Mendelsohn Dunleavy, P.C.; Steve Mendelsohn

(57) ABSTRACT

A cash-dispensing machine (e.g., a casino kiosk or bank ATM) enables a user to use a bank card (e.g., a credit or debit card) to purchase a negotiable instrument via a quasi-cash transaction, redeem the negotiable instrument, and dispense paper currency for the redeemed negotiable instrument without having to go elsewhere (e.g., a casino cage) to redeem the negotiable instrument. The machine enables a user-verification process to be performed to verify the identity of the user before allowing the negotiable instrument to be redeemed.

17 Claims, 3 Drawing Sheets

MACHINE-IMPLEMENTED TWO-PART BANK-CARD-BACKED FINANCIAL TRANSACTIONS

CROSS-REFERENCE TO RELATED APPLICATIONS

This application claims the benefit of the filing date of U.S. provisional application No. 62/840,436, filed on Apr. 30, 2019, the teachings of which are incorporated herein by reference in their entirety.

BACKGROUND

Field of the Invention

The present invention relates to financial transactions conducted using bank cards, such as credit and debit cards, and, more particularly but not exclusively, to such financial transactions conducted at cash-dispensing machines, such as bank ATMs and casino kiosks, that support such financial transactions.

Description of the Related Art

This section introduces aspects that may help facilitate a better understanding of the invention. Accordingly, the statements of this section are to be read in this light and are not to be understood as admissions about what is prior art or what is not prior art.

Conventional cash-dispensing machines, such as bank automated teller machines (ATMs) and casino kiosks, enable owners of credit cards provided by credit-card companies to get cash advances on their credit-card accounts. In a typical cash-advance transaction, a customer will insert his/her credit card into such a cash-dispensing machine and request an amount of cash to be dispensed from the machine. The machine will transmit customer information retrieved from the magnetic strip and/or the EMV (EuroPay, Mastercard, Visa) chip on the credit card to the credit-card company as part of a request for the cash advance. If the credit-card company approves of the cash advance, then the credit-card company will transmit its approval to the machine, which will then dispense the requested amount of cash to the customer.

Credit-card companies, such as Visa and Mastercard, impose limits on the amount of cash they will advance to their individual customers in a given day. If a customer wants to receive an amount of cash that exceeds his/her daily limit, some casinos and other gaming establishments have kiosks that enable customers to perform quasi-cash transactions in which a customer uses his/her credit card to purchase from a financial institution (typically but not necessarily different from the credit-card company) a negotiable instrument that is analogous to a traveler's check.

In particular, the customer inserts his/her credit card into a casino kiosk and requests a quasi-cash transaction involving the purchase of a negotiable instrument having a specified monetary value. The kiosk transmits the request to the financial institution along with the customer's retrieved credit-card information and receives from the financial institution approval for the purchase of the negotiable instrument. The kiosk informs the customer of that approval, ejects the customer's credit card, and instructs the customer to proceed to a casino cashier station (aka a casino cage) to redeem the negotiable instrument, for example, by rendering a message on the kiosk's display and/or by dispensing a piece of paper instructing the customer to go to a casino cage. The kiosk, which is a node of the casino's overall computer system network, also transmits information about the successful purchase of the negotiable instrument through the quasi-cash transaction to a network computer terminal at the cage.

To redeem the newly purchased negotiable instrument, the customer goes to a casino cage, where a casino employee performs one or more customer-verification steps pursuant to PCI (Payment Card Industry) rules in order to confirm that the customer is the same person who purchased the negotiable instrument. For example, the casino employee may ask the customer to provide his/her driver's license to enable the casino employee to verify that the name on the driver's license matches the name of the purchaser of the negotiable instrument and that the photo on the driver's license matches the appearance of the customer. After verifying that the customer is the purchaser of the negotiable instrument, the casino employee will then authorize the redemption of the negotiable instrument and dispense cash (or, in some implementations, a paper or electronic voucher) for the corresponding monetary value to the customer. The casino computer system then informs the financial institution that the negotiable instrument has been redeemed, the financial institution bills the credit-card company for the cost of the negotiable instrument, and the credit-card company likewise bills the customer. See, e.g., Visa Core Rules and Visa Product and Service Rules, 15 Apr. 2015, https://usa.visa.com/dam/VCOM/download/about-visa/15-April-2015-Visa-Rules-Public.pdf, the teachings of which are incorporated herein by references.

The purchase of a negotiable instrument via a quasi-cash transaction and the subsequent redemption of that negotiable instrument may be considered to be two different parts of a two-part credit-card-backed financial transaction. In the prior art, the first part of that two-part financial transaction (i.e., the quasi-cash transaction) is performed at a casino kiosk and the second part (i.e., the redemption of the negotiable instrument) is performed at a casino cage.

BRIEF DESCRIPTION OF THE DRAWINGS

Embodiments of the invention will become more fully apparent from the following detailed description, the appended claims, and the accompanying drawings in which like reference numerals identify similar or identical elements.

DETAILED DESCRIPTION

Detailed illustrative embodiments of the present invention are disclosed herein. However, specific structural and functional details disclosed herein are merely representative for purposes of describing example embodiments of the present invention. The present invention may be embodied in many alternate forms and should not be construed as limited to only the embodiments set forth herein. Further, the terminology used herein is for the purpose of describing particular embodiments only and is not intended to be limiting of example embodiments of the invention.

As used herein, the singular forms "a," "an," and "the," are intended to include the plural forms as well, unless the context clearly indicates otherwise. It further will be understood that the terms "comprises," "comprising," "includes," and/or "including," specify the presence of stated features, steps, or components, but do not preclude the presence or addition of one or more other features, steps, or components. It also should be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Figure 1:
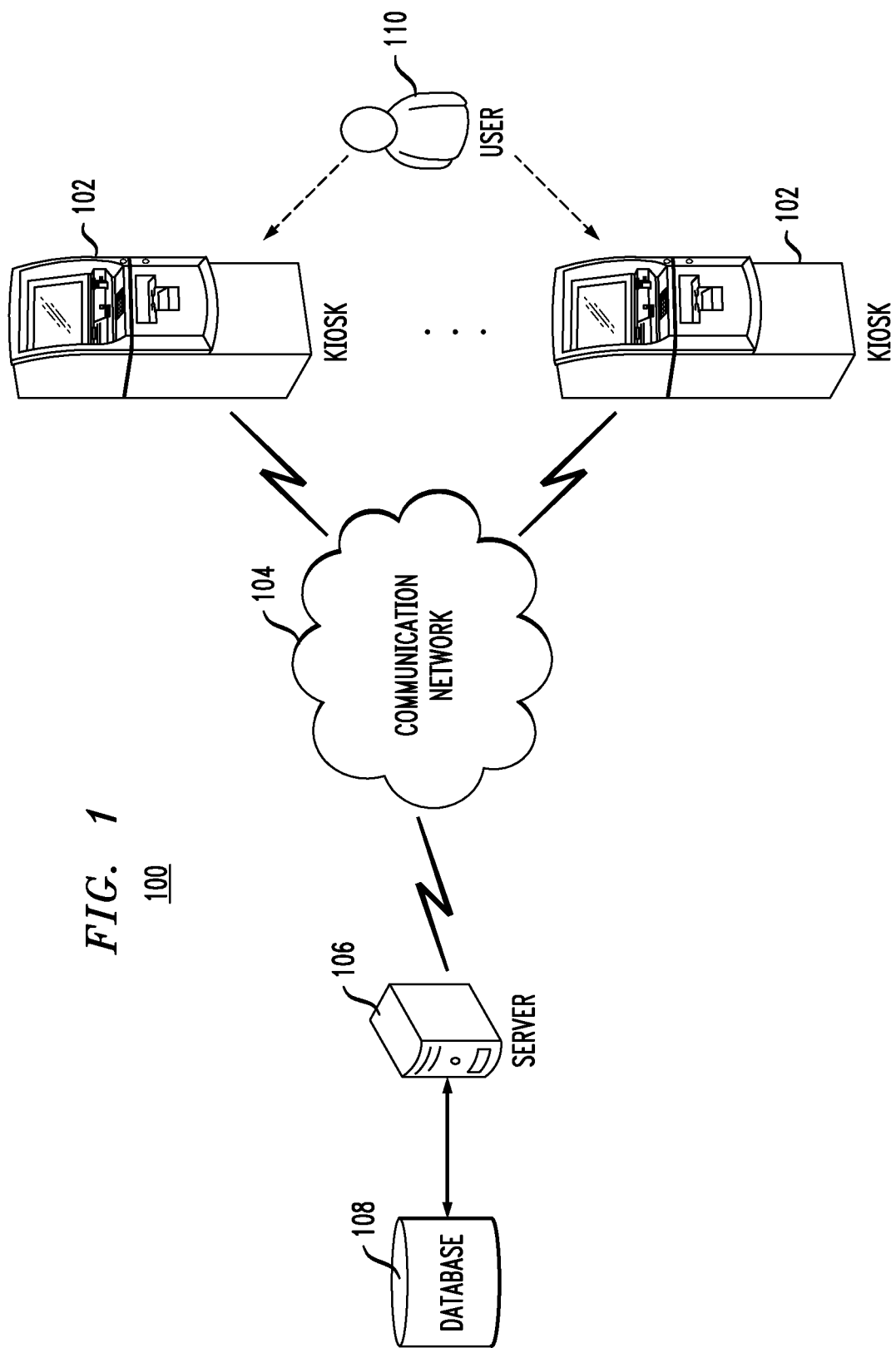
FIG. 1 is a simplified, high-level block diagram of a distributed casino computer system according to one possible embodiment of the invention in which the cash-dispensing machines are casino kiosks.

FIG. 1 is a simplified, high-level block diagram of a distributed casino computer system 100 according to one possible embodiment of the invention in which the cash-dispensing machines are casino kiosks 102. As shown in FIG. 1, the casino system 100 has a plurality of kiosks 102 that are configured to communicate via a suitable communication network 104 with a centralized network server 106 that accesses a database 108 storing information about casino customers' player accounts including information about negotiable instruments purchased and redeemed by those casino customers in quasi-cash transactions at the kiosks 102. The casino system 100 enables customers, like customer 110, to operate the kiosks 102 to perform kiosk functions, including the two-part financial transactions described herein as well as conventional voucher-redemption operations, bill-breaking operations, and bank withdrawals.

The communication network 104 may include a local area network (LAN), a wide area network (WAN), and/or a global area network (GAN). The communication network 104 may provide for wireline, wireless, or a combination of wireline and wireless communication between nodes in the network. The server 106 is any suitable processor-based computer node or sub-system, and database 108 is stored in any suitable computer memory device accessible by the server 106.

Figure 2:
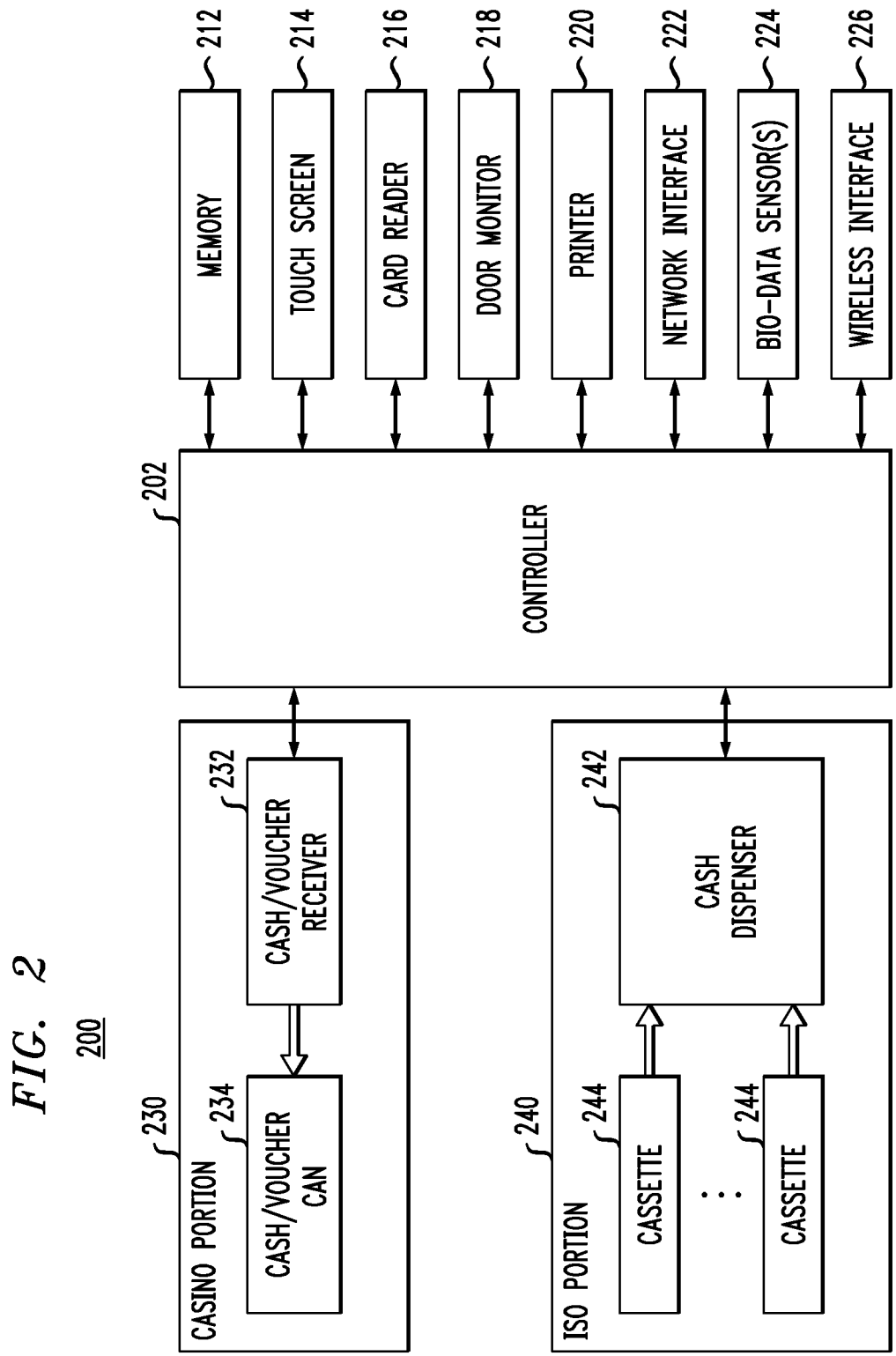
FIG. 2 is a high-level block diagram of a two-portion kiosk according to one embodiment of the invention.

FIG. 2 is a high-level block diagram of a kiosk 200 that can be used to implement the kiosks 102 of FIG. 1 according to one embodiment of the invention. As shown in FIG. 2, kiosk 200 has the following elements configured to perform the following functions that support operations of kiosk 200:

Controller 202 configured to control all of the automated operations of kiosk 200;
Cash/voucher receiver 232 configured to receive paper currency and vouchers from a customer (i.e., a kiosk user) and store them in the cash/voucher can 234;
Cash dispenser 242 configured to retrieve cash from the appropriate cash cassettes 244 and present the retrieved cash to the customer;
Memory 212 configured to store software programs and data for the controller 202;
Display (e.g., a touch screen, keypad, and/or other suitable user-interface device) 214 configured to render textual and graphical information to the customer and to receive manual data inputs from the customer;
Card reader 216 configured to receive and read the customer's player card, credit card, debit card, and/or identification (ID) card (such as a driver's licenses);
Door monitor 218 configured to detect and record physical access to the casino portion 230 of the kiosk 200 and to the ISO portion 240 of the kiosk 200. An independent sales organization (ISO) is a reseller of ATM services;
Printer 220 configured to print receipts and vouchers for the customer;
Network interface 222 configured to enable the controller 202 to communicate with one or more other nodes (not shown), such as a centralized server at a casino cage, of a distributed casino network via wireless and/or wireline communication links depending on the particular implementation and deployment. The network interface 222 also enables the controller 202 to communicate with remote nodes (not shown) outside of the casino network, such as an ATM network processor in order to request ACH (automated clearing house) transfers and receive confirmation of the completion of such ACH transfers;
One or more biological-data sensors 224 (e.g., camera, fingerprint reader, retina scanner, voice analyzer, DNA sampler); and
A wireless (e.g., Bluetooth Low Energy (BLE) and/or WiFi) interface to communicate with customers' wireless devices (e.g., cell phones and/or tablets).

The cash/voucher receiver 232 receives paper currency and vouchers from customers and deposits them into the cash/voucher can 234. The receiver 232 identifies the denomination of each inserted item of paper currency (a.k.a. a note or bill), reads information from each inserted voucher, and transmits those denominations and information, as appropriate, to the controller 202.

Under the control of the controller 202, the cash dispenser 242 retrieves one or more items of paper currency from one or more of the cash cassettes 244, each provisioned to store paper currency of a specific denomination, and presents the item(s) to the customer. For example, the ISO portion 240 may have six cash cassettes: one $1 cassette, two $5 cassettes, two $20 cassettes, and one $100 cassette. In certain embodiments, the cash dispenser 242 may be either (i) a present-type cash dispenser that collects all of the bills from the appropriate cash cassettes 244 and presents them to the customer as a single stack of bills or (ii) a dispense-type cash dispenser that sequentially retrieves from an appropriate cash cassette 244 and presents to the customer one bill at a time.

As represented in FIG. 2, kiosk 200 has two secure portions: (1) a casino portion 230 having the cash/voucher receiver 232 and the cash/voucher can 234 and (2) an ISO portion 240 having the cash dispenser 242 and the cash cassettes 244. The casino portion 230 is physically located in a first locked compartment of the two-portion kiosk 200 that is accessible only by individuals authorized by the casino's management to have such access, while the ISO portion 240 is physically located in a second locked compartment of the two-portion kiosk 200 that is accessible only by individuals authorized by the ISO's management to have such access. The casino is responsible for retrieving and handling the cash and vouchers that accumulate in the cash/voucher can 234 located in the casino portion 230, while the ISO is responsible for refilling and/or replacing the cash cassettes 244 located in the ISO portion 240.

Note that other embodiments of the invention involve kiosks that differ from kiosk 200 of FIG. 2 in ways that are independent of the present invention, such as the existence of the two secure portions 230 and 240.

According to certain embodiments of the invention, a casino kiosk, such as one of kiosks 102 and 200 of FIGS. 1 and 2, is designed to support both parts of a two-part credit-card-backed financial transaction consisting of (i) the purchase of a negotiable instrument via a quasi-cash transaction and (ii) the redemption of that negotiable instrument. In particular, the kiosk enables a casino customer to purchase such a negotiable instrument via a quasi-cash transaction using the customer's credit card and then redeem that negotiable instrument in one continuous process and without having to visit a casino cage. In order to support the required customer-verification process, the kiosk is designed to verify the identity of the customer before allowing the just-purchased negotiable instrument to be redeemed and before dispensing cash to the customer for the monetary value of that negotiable instrument.

In certain embodiments, in addition to the customer's credit card, the kiosk requires the customer to insert an ID card, such as a driver's license. Information retrieved by the kiosk from the ID card is then compared with information retrieved by the kiosk from the credit card to determine that the person identified by the ID card is the owner of the credit card. Depending on the implementation, this comparison can be performed (i) automatically at the kiosk or at another node of the casino computer system, such as server 106 of FIG. 1, or (ii) manually by a casino employee at some node of the casino computer system. In some embodiments, the kiosk has a camera, and the customer-verification process involves the comparison of the image of the customer generated by the kiosk's camera with the image on the ID card again either (i) automatically at the kiosk or at another node using computer-based image recognition and comparison processing or (ii) manually by the casino employee viewing the two images. Note that, in some implementations, the image-comparison step also involves one or more stored images of the customer that were retained by the casino computer system from the customer's previous financial transactions.

As used herein, if a particular processing step is necessarily performed at a casino kiosk, then that processing step is described as being performed at a kiosk. If a particular processing step is described as being performed by the casino computer system, then that processing step may possibly, but not necessarily, be able to be performed at a casino kiosk, depending on the particular implementation.

In some embodiments, the kiosk is designed to acquire biological data about the customer, such as fingerprints, retinal scans, voice recordings, and/or DNA samples, where the customer-verification process involves the comparison of such kiosk-acquired biological data with stored biological data about the customer.

In some embodiments, the casino computer system transmits a numerical code value in a text message to the cell phone associated with the credit card and/or the ID card and the kiosk instructs the customer to enter that code value using the kiosk's keypad, where the customer-verification process involves the comparison of those transmitted and entered code values.

In some embodiments, the kiosk and/or other nodes of the casino computer system generate, compare, and store hashed values of the raw data stored on the customer's credit card and/or ID card rather than the raw data itself in order to comply with PCI rules prohibiting entities, like casinos, from retaining such raw data after the completion of financial transactions.

In some embodiments, a customer is initially required to go to the casino cage one or more times to redeem negotiable instruments in order to establish a track record of one or more successful transactions before the casino computer system allows that customer to perform both parts of a two-part financial transaction at a kiosk.

In some embodiments, the extent of the customer-verification process (i.e., the number and/or types of steps involved in the process) may vary for different transactions with the casino computer system deciding possibly on an ad hoc basis the particular verification steps required for a particular two-part financial transaction. For example, the customer-verification process may be more thorough and include more verifications steps for two-part financial transactions involving greater monetary values.

In some implementations, the casino computer system keeps track of the history of such two-part financial transactions for each customer. If and when a customer requests a new two-part financial transaction that differs from that customer's normal transaction, then the casino computer system can flag that new transaction for heightened customer-verification processing, including possibly requiring the customer to visit a casino cage to redeem the negotiable instrument.

In some embodiments, the kiosk is designed to retain (at least) two cards at the same time. For example, in some embodiments, in order to perform the two-part financial transaction, the kiosk initially requests, receives, processes, and retains the customer's credit card and then, while still retaining the credit card, the kiosk requests, receives, processes, and retains the customer's ID card, thereby retaining both the customer's credit card and the customer's ID card at the same time. In some embodiments such as those where the ID card is a driver's license, then the kiosk card reader is capable of scanning both sides of the ID card. In some implementations, after completing the customer-verification process, the kiosk ejects the ID card and, after completing the two-part financial transaction, the kiosk ejects the credit card along with the requested cash. These embodiments require the kiosk card reader, such as card reader 216 of FIG. 2, to be able to handle (at least) two cards at the same time. Alternatively, the kiosk could have two (or more) card readers, one for each different type of card (e.g., credit card and ID card). Alternatively, the kiosk camera could be used to scan the customer's ID card. By retaining the credit card, the kiosk could adapt to alternative transaction types and request the customer to insert an ID card to perform a quasi-cash transaction after attempting an ATM or other PIN-based transaction that might have failed due to exceeding a daily limit or entering an incorrect PIN.

Note that fees may be charged by one or more of the various entities for supporting two-part financial transactions, including the casino, the financial institution that sells and redeems the negotiable instrument, and/or the credit-card company.

Figure 3:
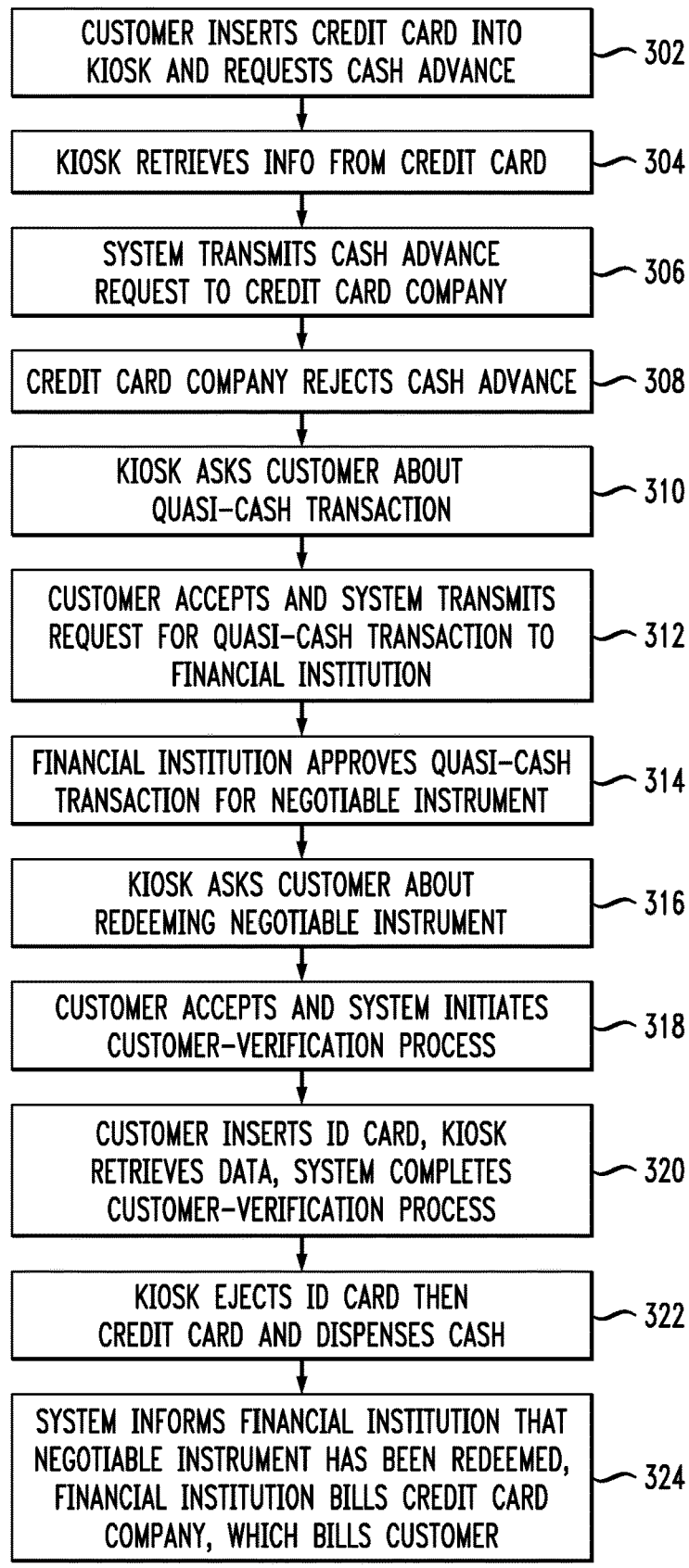
FIG. 3 is a flow diagram of one possible scenario for certain implementations of a kiosk in a casino computer system.

FIG. 3 is a flow diagram of one possible scenario for certain implementations of a kiosk in a casino computer system, in which the two-part financial transaction involves the following sequence of steps:

1) Step 302: A casino customer inserts his/her credit card into a casino kiosk and requests a cash advance of a specified monetary value;
2) Step 304: The kiosk retrieves customer information from the magnetic strip and/or the EMV chip on the credit card;
3) Step 306: The casino computer system transmits a request to the credit-card company for a cash advance having the specified monetary value;
4) Step 308: The credit-card company determines that the customer has already reached his/her daily cash-advance limit or that the requested cash advance will exceed that limit and the credit-card company transmits a rejection of the requested cash advance to the casino computer system. (Note that, in some implementations, the credit-card company may authorize a partial cash advance up to the daily limit, but reject the full, requested cash advance.)

5) Step 310: The kiosk informs the customer that the requested cash advance has been rejected and then asks the customer if the customer would like to purchase a negotiable instrument via a quasi-cash transaction for the requested monetary value.

6) Step 312: The customer agrees, and the casino computer system transmits a request for the quasi-cash transaction to a financial institution that sells negotiable instruments. In some implementations, the customer has a previously established account with the financial institution.

7) Step 314: The financial institution verifies that the customer is entitled to purchase a negotiable instrument via a quasi-cash transaction and transmits authorization for the quasi-cash transaction to the casino computer system.

8) Step 316: The kiosk informs the customer that the quasi-cash transaction has been completed and asks the customer if the customer would like to redeem the negotiable instrument purchased via the quasi-cash transaction.

9) Step 318: The customer agrees, and the casino computer system automatically performs (or a casino employee located at another node of the casino computer system manually performs) a customer-verification process to confirm that the customer is the owner of the credit card.

10) Step 320: The kiosk requests the customer to insert his/her ID card (while the kiosk card reader still retains the customer's credit card), the kiosk retrieves data stored on the inserted ID card, and the casino computer system processes that retrieved data as part of the customer-verification process.

11) Step 322: After the customer-verification process has been successfully completed, the kiosk informs the customer as such, ejects first the customer's ID card (in implementations involving such ID cards) and then the customer's credit card, and dispenses cash for the specified monetary value of the now-redeemed negotiable instrument. Note that, in some implementations, the kiosk can dispense paper vouchers instead of or in addition to dispensing cash.

12) Step 324: The casino computer system informs the financial institution that the negotiable instrument has been redeemed, the financial institution bills the credit-card company for the negotiable instrument, and the credit-card company bills the customer accordingly.

In some implementations, if the customer refuses the kiosk's offer to redeem the negotiable instrument right away, the customer can redeem the negotiable instrument at a later time either at a casino cage or at the same or a different casino kiosk. In other implementations, the kiosk is designed to automatically redeem the negotiable instrument without asking the customer for authorization to proceed.

In some implementations, if the customer does not redeem the negotiable instrument within a specified time limit, then the quasi-cash transaction is automatically reversed (although, depending on the implementation, the casino, the financial institution, and/or the credit-card company may still charge fees to the customer's credit card account for the now-reversed transaction).

In some implementations, the kiosk is designed to retain the received credit card and/or the received ID card indefinitely if the casino computer system automatically determines (or if a casino employee manually determines) that a problem exists (e.g., the customer-verification process fails).

In some embodiments, the casino computer system could keep track of successful and unsuccessful transactions for each customer, where successful transactions could be non-fraudulent transactions that do not end with a chargeback, while unsuccessful transactions could be transactions involving either fraud or a chargeback. A chargeback occurs when a customer contacts the company issuing the customer's credit card to dispute a charge on the customer's account. Note that a transaction with a negative identification would not necessarily be treated as a fraudulent transaction. Approval for such a transaction would be declined and the customer would simply be instructed to go to the cage to complete the transaction in person face-to-face with a casino employee. Tracking transactional histories could include customer-specific trends with respect to amount, location, time of day, and/or day of week.

In some embodiments, the casino relies on third-parties to assist in the authentication of ID cards, like driver's licenses, where images and/or data from the ID cards are transmitted to a third party for validation using various known authentication tools and agencies.

In some embodiments, a kiosk could use Bluetooth Low Energy (BLE) and/or WiFi signals received from a customer's proximal, registered cell phone to verify the customer's identity.

In some embodiments, the casino computer system can retain images captured during prior transactions as a means for verify the identity of a customer requesting a new transaction.

Although the invention has been described in the context of credit cards, those skilled in the art will understand that the invention can also be implemented in the context of other types of bank cards, such as debit cards.

Although the invention has been described in the context of casino computer systems having casino kiosks, the invention can also be implemented in the context of other computer systems having other types of cash-dispensing machines, such as (without limitation) bank computer systems having bank ATM machines.

According to certain embodiments, a cash-dispensing machine comprises a controller that controls automated operations of the cash-dispensing machine; a card reader that receives and reads a bank card; one or more cash cassettes that store paper currency; a cash dispenser that dispenses paper currency from the one or more cash cassettes per instructions from the controller; a user-interface device that renders information to a user of the machine and receives and forwards instructions from the user to the controller; and a network interface that enables the controller to communicate with one or more other nodes. The cash-dispensing machine enables the user to perform a two-part bank-card-backed financial transaction comprising (i) purchase of a negotiable instrument via a quasi-cash transaction and (ii) redemption of the negotiable instrument by (a) the card reader receiving and reading a bank card inserted by the user and transmitting corresponding retrieved banking information to the controller; (b) the user-interface device receiving a request from the user for a current two-part bank-card-backed financial transaction and transmitting the request to the controller; (c) the controller using the network interface to communicate with the one or more other nodes to purchase a current negotiable instrument via a current quasi-cash transaction; (d) the controller enabling the user to redeem the current negotiable instrument; and (e) the cash dispenser accessing the one or more cash cassettes to dispense, to the user, paper currency corresponding to the redeemed current negotiable instrument.

According to some or all of the above embodiments, for (d): (d1) the card reader (i) receives and reads an identification (ID) card inserted by the user, before ejecting the bank card and (ii) transmits corresponding retrieved ID information to the controller; and (d2) the controller enables the ID information to be used to verify the user's identity in order to approve the redemption of the current negotiable instrument.

According to some or all of the above embodiments, for (d2), the controller transmits the ID information via the network interface to an other node for approval of the redemption of the current negotiable instrument.

According to some or all of the above embodiments, the other node is a casino cage terminal and the approval is performed manually by a casino employee at the casino cage.

According to some or all of the above embodiments, the ID card is a driver's license.

According to some or all of the above embodiments, the card reader ejects the ID card before ejecting the bank card.

According to some or all of the above embodiments, the machine is a casino kiosk; and the bank card is a credit card.

According to some or all of the above embodiments, for (b): (b1) the user-interface device receives a request from the user for a cash advance and transmits the cash-advance request to the controller; (b2) the controller transmits the cash-advance request to an other node; (b3) if the cash-advance request is rejected, then the controller instructs the user-interface device to offer the user the current two-part financial transaction; and (b4) if the user requests the current two-part financial transaction, then the user-interface device transmits the user's request to the controller.

According to some or all of the above embodiments, the machine further comprises a camera that generates an image of the user that is compared with one or more other images of the user in order to verify the identity of the user in order to approve the redemption of the current negotiable instrument.

According to some or all of the above embodiments, one of the one or more other images is an image on an ID card inserted into the card reader by the user.

According to some or all of the above embodiments, at least one of the one or more other images is a stored image of the user from a previous financial transaction.

According to some or all of the above embodiments, the machine further comprises one or more biological-data sensors that collect the user's biological data for use by the controller in verifying the user's identity in order to approve the redemption of the current negotiable instrument.

According to some or all of the above embodiments, for (d): (d1) the controller enables a code value to be transmitted to the user's cell phone; (d2) the user-interface device receives and transmits the code value entered by the user to the controller; and (d3) the controller enables the entered code value to be compared to the transmitted code value to verify the user's identity in order to approve the redemption of the current negotiable instrument.

According to some or all of the above embodiments, the controller generates hashed values corresponding to the retrieved banking information for transmission to the one or more other nodes.

According to some or all of the above embodiments, the user goes to a casino cage to redeem one or more previous negotiable instruments before the controller enables the user to redeem the current negotiable instrument at the machine.

According to some or all of the above embodiments, for (d), the controller enables a user-verification process to be performed that is a function of the monetary value of the quasi-cash transaction.

According to some or all of the above embodiments, for (d), the controller enables the current two-part financial transaction to be compared to one or more previous two-part financial transactions and enables a user-verification process to be performed that is a function of the comparison.

According to some or all of the above embodiments, the controller enables a quasi-cash transaction to be automatically reversed if a corresponding negotiable instrument is not redeemed within a specified time limit after completion of the quasi-cash transaction.

According to some or all of the above embodiments, the machine does not eject a user's bank card if a problem is detected.

According to some or all of the above embodiments, the machine further comprises a wireless interface that communicates with the user's wireless device to verify the user's identity.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing.

Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system."

Embodiments of the invention can be manifest in the form of methods and apparatuses for practicing those methods. Embodiments of the invention can also be manifest in the form of program code embodied in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing the invention. Embodiments of the invention can also be manifest in the form of program code, for example, stored in a non-transitory machine-readable storage medium including being loaded into and/or executed by a machine, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

Any suitable processor-usable/readable or computer-usable/readable storage medium may be utilized. The storage medium may be (without limitation) an electronic, magnetic, optical, electromagnetic, infrared, or semiconductor system, apparatus, or device. A more-specific, non-exhaustive list of possible storage media include a magnetic tape, a portable computer diskette, a hard disk, a random access memory (RAM), a read-only memory (ROM), an erasable programmable read-only memory (EPROM) or Flash memory, a portable compact disc read-only memory (CD-ROM), an optical storage device, and a magnetic storage device. Note that the storage medium could even be paper or another suitable medium upon which the program is printed, since the program can be electronically captured via, for instance, optical scanning of the printing, then compiled, interpreted, or otherwise processed in a suitable manner including but not limited to optical character recognition, if necessary, and then stored in a processor or computer memory. In the context of this disclosure, a suitable storage medium may be any medium that can contain or store a program for use by or in connection with an instruction execution system, apparatus, or device.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain embodiments of this invention may be made by those skilled in the art without departing from embodiments of the invention encompassed by the following claims.

In this specification including any claims, the term "each" may be used to refer to one or more specified characteristics of a plurality of previously recited elements or steps. When used with the open-ended term "comprising," the recitation of the term "each" does not exclude additional, unrecited elements or steps. Thus, it will be understood that an apparatus may have additional, unrecited elements and a method may have additional, unrecited steps, where the additional, unrecited elements or steps do not have the one or more specified characteristics.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

All documents mentioned herein are hereby incorporated by reference in their entirety or alternatively to provide the disclosure for which they were specifically relied upon.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

It should be appreciated by those of ordinary skill in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Unless otherwise specified herein, the use of the ordinal adjectives "first," "second," "third," etc., to refer to an object of a plurality of like objects merely indicates that different instances of such like objects are being referred to, and is not intended to imply that the like objects so referred-to have to be in a corresponding order or sequence, either temporally, spatially, in ranking, or in any other manner.

What is claimed is:

1. A casino kiosk for a casino computer system having a casino computer system server, the casino kiosk comprising:
    a processor configured to control automated operations of the casino kiosk;
    a card reader configured to receive and read a bank card of a casino patron, wherein the bank card is associated with a bank;
    a dispenser configured to issue paper currency or paper or electronic vouchers per instructions from the processor;
    a user-interface device configured to render information to the casino patron using the casino kiosk and receive and forward instructions from the casino patron to the processor; and
    a network interface device configured to enable the processor to communicate with the casino computer system server, wherein the casino kiosk is configured to enable the casino patron to perform a two-part bank-card-backed financial transaction comprising (i) purchase of a negotiable instrument from a financial institution via a quasi-cash transaction, wherein the financial institution is different from the bank, and (ii) redemption of the negotiable instrument with the financial institution, by:
    (a) the casino kiosk receiving the bank card of the casino patron inserted by the casino patron and reading banking information from the bank card;
    (b) the casino kiosk receiving a cash-advance request from the casino patron for a cash advance and transmitting (i) the banking information read from the casino-patron's bank card and (ii) the cash-advance request to the bank via the casino computer system server;
    (c) the casino kiosk receiving a rejection of the cash-advance request from the bank via the casino computer system server;
    (d) the casino kiosk offering the casino patron processor the two-part bank-card-backed financial transaction;
    (e) the casino kiosk receiving a request from the casino patron for a current two-part bank-card-backed financial transaction;
    (f) the casino kiosk communicating with the financial institution via the casino computer system server to enable the casino patron to to purchase a current negotiable instrument from the financial institution via a current quasi-cash transaction corresponding to the current two-part bank-card-backed financial transaction;
(g) the casino kiosk enabling the casino patron to redeem the current negotiable instrument by:
  (g1) receiving and reading a form of identification (ID) for the casino patron; and
  (g2) transmitting the casino patron's ID information to the casino computer system server to verify the casino patron's identity in order to approve the redemption of the current negotiable instrument without requiring the casino patron to leave the casino kiosk and go to a casino cage of the casino; and
(h) the casino kiosk issuing, to the user, paper currency or a paper or electronic voucher corresponding to the redeemed current negotiable instrument, wherein:
  the casino kiosk automatically reverses the current quasi-cash transaction if the current negotiable instrument is not redeemed by the casino patron within a specified time limit after completion of the current quasi-cash transaction; and
  the casino kiosk further comprises a camera configured to generate an image of the casino patron that is compared with one or more other images of the casino patron in order to verify the identity of the casino patron in order to approve the redemption of the current negotiable instrument.

2. The casino kiosk of claim 1, wherein a casino employee accesses the casino computer system server to manually approve the redemption of the negotiable instrument using the casino patron's ID information.

3. The casino kiosk of claim 1, wherein the form of ID is a driver's license.

4. The casino kiosk of claim 1, wherein the bank card is a credit card.

5. The casino kiosk of claim 1, wherein one of the one or more other images is an image on the form of ID inserted into the casino kiosk by the casino patron.

6. The casino kiosk of claim 1, wherein at least one of the one or more other images is a stored image of the casino patron from a previous financial transaction.

7. The casino kiosk of claim 1, the casino kiosk further comprising one or more biological-data sensors configured to collect the casino patron's biological data for use in verifying the casino patron's identity in order to approve the redemption of the current negotiable instrument.

8. The casino kiosk of claim 1, wherein:
the casino kiosk is configured to enable a code value to be transmitted to the casino patron's cell phone;
the casino kiosk is configured to receive the code value entered by the casino patron; and
the casino kiosk is configured to enable the entered code value to be compared to the transmitted code value to verify the casino patron's identity in order to approve the redemption of the current negotiable instrument.

9. The casino kiosk of claim 1, wherein the casino kiosk is configured to generate hashed values corresponding to the retrieved banking information for transmission to the casino computer system server.

10. The casino kiosk of claim 1, wherein the casino kiosk is configured to enable the casino patron to redeem the current negotiable instrument at the machine after the casino patron redeems one or more previous negotiable instruments in person at the casino cage.

11. The casino kiosk of claim 1, wherein the casino kiosk is configured to enable a user-verification process to be performed that is a function of the monetary value of the quasi-cash transaction.

12. The casino kiosk of claim 1, wherein the casino kiosk is configured to enable the current two-part financial transaction to be compared to one or more previous two-part financial transactions and enable a user-verification process to be performed that is a function of the comparison.

13. The casino kiosk of claim 1, wherein the casino kiosk is configured to enable the quasi-cash transaction to be automatically reversed and to charge a fee for the automatically reversed quasi-cash transaction if the corresponding negotiable instrument is not redeemed within the specified time limit after completion of the quasi-cash transaction.

14. The casino kiosk of claim 1, wherein the casino kiosk is configured to not eject the casino patron's bank card if a problem is detected.

15. The casino kiosk of claim 1, the casino kiosk further comprising a wireless interface configured to communicate with the casino patron's wireless device to verify the casino patron's identity.

16. The casino kiosk of claim 1, wherein:
the casino kiosk further comprises one or more cash cassettes configured to store paper currency; and
the dispenser is a cash dispenser configured to dispense paper currency from the one or more cash cassettes corresponding to the redeemed current negotiable instrument per instructions from the processor.

17. The casino kiosk of claim 1, wherein the dispenser is a printer configured to print a paper voucher corresponding to the redeemed current negotiable instrument per instructions from the processor.

* * * * *